United States Patent [19]
Dooley et al.

[11] 4,441,360
[45] Apr. 10, 1984

[54] ENGINE TIMING INSTRUMENT

[75] Inventors: Daniel J. Dooley, Burr Ridge, Ill.;
Warren L. Williamson, Mesa, Ariz.

[73] Assignee: Creative Tool Company, Burr Ridge, Ill.

[21] Appl. No.: 357,638

[22] Filed: Mar. 12, 1982

[51] Int. Cl.$^3$ .......................................... G01M 15/00
[52] U.S. Cl. .................................. 73/119 A; 324/392
[58] Field of Search .............. 73/119 A; 324/391, 392

[56] References Cited
U.S. PATENT DOCUMENTS

Re. 28,904 7/1976 Maisonville ......................... 324/392
4,373,384 2/1983 Olson et al. ....................... 73/119 A Primary Examiner—Jerry W. Myracle
Attorney, Agent, or Firm—Neuman, Williams, Anderson & Olson

[57] ABSTRACT

An engine timing instrument as disclosed which is particularly designed for use with diesel engines and which responds to the actual time of firing within a cylinder. A strobe may be flashed at the crankshaft angle at which firing occurs and the crankshaft of the strobe flash may be advanced with respect to the firing angle until the strobe flash occurs at a top dead center position. The angle of advance of the strobe flash is measured to then indicate the angle of firing relative to the top dead center position. Important features relates to the use of a piezoelectric transducer placed in a glow plug hole to measure pressure, the transducer being connected to circuitry which provides both a firing pulse and a reference pulse. The reference pulse occurs close to and not later than the top dead center position and is used to measure the time of a subsequent firing pulse. Electronic circuitry is provided for counting and storing clock pulses and performing digital operations in a manner such as to obtain a high degree of accuracy.

22 Claims, 6 Drawing Figures

ENGINE TIMING INSTRUMENT

This invention relates to an engine timing instrument and more particularly to an engine timing instrument designed for use with diesel engines although features of the invention may have other applications. The instrument of the invention is quite simple to use and is readily attached to an engine and it produces a very accurate indication of engine timing. It is highly reliable, rugged and durable.

BACKGROUND OF THE INVENTION

Instruments have heretofore been provided for timing of internal combustion engines which use spark plugs for ignition of a fuel-air mixture. In one type of instrument, a strobe lamp is flashed in response to an ignition pulse which is applied to the spark plug of a certain cylinder, the strobe lamp being positioned to illuminate one or more marks on a damper which rotates with the engine crankshaft and one or more marks on the engine block. With marks which indicate the angular position in degrees, the number of degrees of advance of the spark can be determined by the operator.

In another type of instrument, a delay between the ignition pulse and the flashing of the lamp may be obtained and adjusted until there is an alignment of a pair of primary marks which indicate the top dead center position or "TDC" of the engine. The number of degrees of spark advance is then determined from the magnitude of the adjusted delay.

Such instruments are not suitable for diesel engines in which no ignition pulse is developed. For diesel engines, various types of timing instruments have been proposed but none have been completely satisfactory. In one type of instrument, the injection of fuel into the engine may be sensed at a line leading to an injector. In another, injection is measured at the injector itself. With such instruments, the timing may be measured to obtain valuable information, especially when the sensing is performed at the injector. However, such arrangements do not provide a direct indication of the actual time of firing within the engine.

In an attempt to determine the actual time of firing, instruments have been proposed using fiber optic devices to sense the flash produced upon ignition of the fuel after injection. Such arrangements have been complicated and expensive and have had problems because of a build-up of carbon deposits which preclude reliable detection through fiber optics or the like.

Another problem with respect to diesel engines arises in determining the crankshaft angle at which firing occurs. The type of instrument as used for ignition type engines would not be suitable for diesel engines in which the firing occurs after the top dead center position rather than before. In engines which have provisions for magnetic pick-ups, the position of the pick-ups has not been appropriate for accurate determination of the firing angle even if reliable means were provided for detection of the firing angle.

SUMMARY OF THE INVENTION

This invention was evolved with the general object of overcoming disadvantages of prior art instruments and of providing an instrument which accurately and reliably indicate the timing of firing a diesel engine.

Another object of the invention is to provide an instrument which is easily attached to an engine for measurement of the time of firing and which is otherwise simple to operate, while producing accurate and reliable results.

In accordance with one aspect of the invention, a measurement is made with respect to the elapsed time between an electrical reference pulse and an electrical firing pulse and the measurement so made is used for determination and adjustment of the timing of an engine. The electrical reference pulse is generated at a crankshaft angle which is only a few degrees ahead of the earliest angle at which a firing pulse might be generated and preferably not later than a top dead center position of the piston in the cylinder as to which a measurement is being made. The electrical firing pulse establishes the firing or combustion within the cylinder and in a diesel engine, for example, it generally occurs at a crankshaft angle of only a very few degrees after the top dead center position of the piston. The measurement of the elapsed time between the electrical firing and reference pulses can be made by electrical circuitry with a high degree of accuracy, preferably by counting high frequency clock pulses. A high accuracy is also facilitated because the measured elapsed time interval is only a small fraction of the time for a complete engine cycle and any fractional error in the measurement produces a much smaller fractional error in relation to a complete engine cycle.

Important features of the invention relate to the development of an output pulse for comparison of its timing with an indicated angular position of the engine crankshaft. The output pulse is developed after a certain time delay following a reference pulse in one engine cycle, the delay time being a linear function of the elapsed time measurement between a reference pulse and a firing pulse in a preceding engine cycle. With this feature, the crankshaft angle at which the output pulse is developed can be substantially independent of variations in the crankshaft angle at which the reference pulse is developed. It is only necessary that the reference pulse be developed at substantially the same angle in the cycle in which the output pulse is generated as in the preceding cycle in which the elapsed time was measured beteen the reference and firing pulses. Preferably, an output pulse is developed in each engine cycle, using the elapsed time measurement of the immediately preceding engine cycle. With the engine operating at a uniform speed, the angle of generation of the reference pulse is uniform and the measurement obtained is highly accurate.

For comparing the timing of the output pulse with an indicated angular position of the engine crankshaft, the output pulse may preferably be used to flash a strobe lamp and to illuminate alignable marks on a stationary engine part and a part rotatable with the engine crankshaft.

A further feature of the invention relates to the reduction of the delay time of generation of the output pulse by an adjustable amount which is preferably such that the timing of the output pulse can be synchronized with a top dead center position indicated by marks on the engine parts. The adjusted reduction of the delay time is preferably controlled and indicated in degrees or other units of crankshaft angular rotation, so that the firing time is directly indicated in such units.

An important advantage of this arrangement is that the manner of setting up the instrument and making the measurement is quite simple and only a minimal amount of skill is required to operate the instrument. Another important advantage is that the procedure used by an operator in setting up and using the instrument of the invention is quite similar to and consistent with procedures used with conventional instruments for tuning of spark type engines. Thus, one familiar with such instruments can readily use and is not apt to misuse an instrument constructed in accordance with the invention.

Important features of the invention relate to the generation of the electrical firing pulse and are based upon the discovery that an abrupt increase in pressure which is produced within a cylinder at the time of firing can be sensed by an electro-mechanical transducer and accurately detected by electronic circuitry. In a diesel engine, the glow plug can be replaced by a transducer and by using a differentiating circuit and a high pass filter, an electrical pulse of substantial amplitude is developed with a very high degree of reliability. The transducer may preferably be a piezoelectric transducer which is connected to a resistive load in a manner such as to provide a differentiating circuit.

Additional important features of the invention relate to the generation of the electrical reference pulses which may also be developed in response to changes in pressure in the engine cylinder, preferably using the same transducer as used for generation of the electrical firing pulses. It is found that in a cylinder of a diesel engine, there is a rise in pressure ahead of the top dead center position which is not as rapid as the rise produced in response to engine firing but which is sufficiently steep to permit reliable detection through a transducer and electrical circuitry connected thereto. Preferably, the pressure waveform is differentiated to produce a signal which is applied through a low pass filter to a peak detector circuit which may operate to trigger a monostable multivibrator. The low pass filter and the peak detector cooperate to provide adequate discrimination with respect to the firing pulse component while at the same time providing reliable generation of a reference pulse.

Additional important features relate to circuitry for measurement of the elapsed time between a reference pulse and a firing pulse, for development of an output pulse after a certain delay controlled by the elapsed time measurement and for a calibrated adjustment of the delay. The electrical circuitry may be readily implemented using standard types of clock, counter, latch and other digital integrated circuits or by using microprocessor circuitry.

This invention contemplates other objects, features and advantages which will become more fully apparent from the following detailed description taken in conjunction with the accompanying drawings:

DESCRIPTION OF A PREFERRED EMBODIMENT

Figure 1:
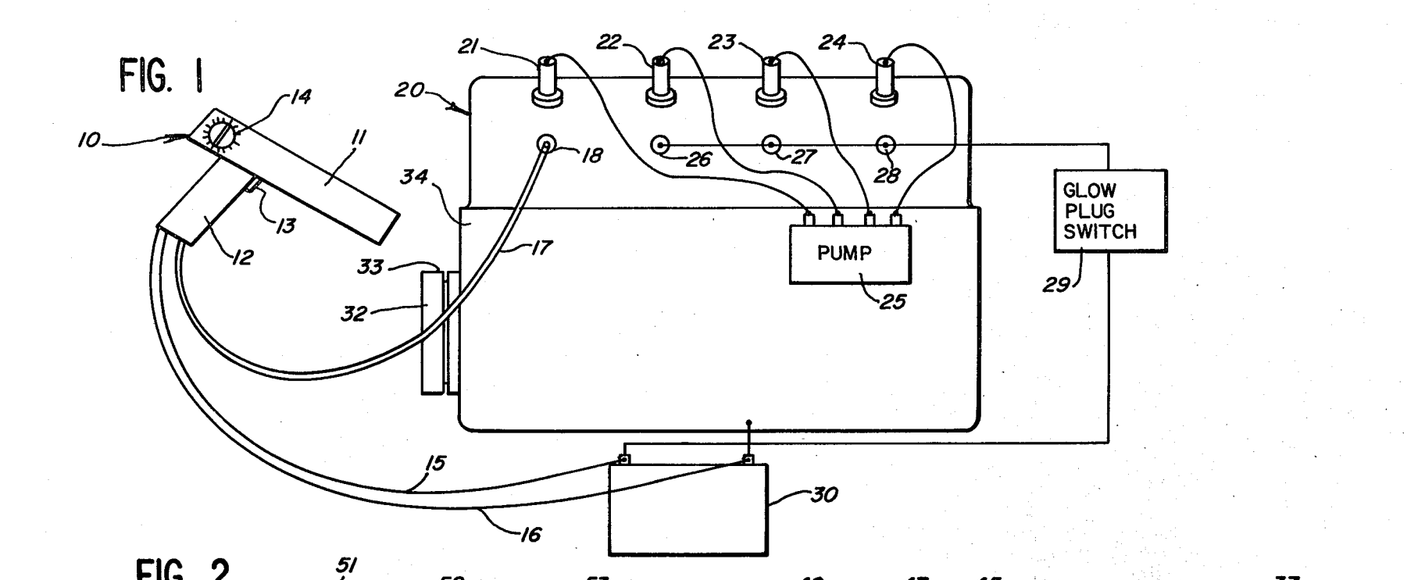
FIG. 1 shows an instrument constructed in accordance with the invention, the instrument being diagrammatically illustrated in use in the timing of a diesel engine.

Reference numeral 10 generally designates an engine timing instrument constructed in accordance with the principles of the invention. As shown in FIG. 1, the instrument 10 is in the form of a gun having a strobe lamp within a barrel portion 11 thereof and having a handle portion 12 with a trigger switch button 13 adjacent the junction between the arrow portion 11 and the handle portion 12. A rotatable adjustment knob 14 is provided on the rearward end of the barrel portion 11 and carries a pointer which is alignable with calibration marks on the barrel portion 11. A pair of insulated wires 15 and 16 are provided for connecting the instrument 10 to a conventional 12-volt battery and a cable 17 connects the instrument 10 to a transducer 18 which is arranged to be screwed into the glow plug hole of an engine 20 after removal of a glow plug therefrom.

The engine 20, as diagrammatically illustrated, may be a four cylinder diesel engine which includes four injectors 21, 22, 23 and 24 connected to a pump 25. In the illustrated arrangement, the glow plug for the cylinder corresponding to injector 21 has been removed and replaced with the transducer 18 while glow plugs 26, 27 and 28 for the cylinders corresponding to injectors 22, 23 and 24 are connected through a glow plug switch 29 to a battery 30. The engine 20 may additionally include a dynamic damper 32 which is provided with one or more timing marks 33, alignable with a timing mark on the block of the engine, indicated by reference numeral 34. It will be understood that the engine includes a crankshaft coupled through connecting rods to pistons within cylinders into which fuel is injected through the injectors 21–24. The alignment of a primary pair of marks on the dynamic damper 33 and engine block 34 indicates a top dead center position of the piston in a predetermined cylinder, in this case the cylinder which is associated with the injector 21.

In a typical operation using the timing instrument 10 of the invention, the engine 20 may be started using glow plugs in all cylinders and then run until it reaches a stable temperature. Then the glow plug for the first cylinder may be removed and replaced by the transducer 18 and, at the same time, the wires 15 and 16 may be connected to the battery terminals, a pair of clips being preferably provided for this purpose. Then the engine may be restarted, and it may then be operated at a certain speed such as 1200 RPM, for example. Then the operator points the instrument at the region where the index marks about in register at the top dead center position of the first cylinder and then depresses the trigger button 13 to illuminate the marks. If a primary pair of marks are not aligned, the operator rotates the adjustment knob 14 until they do align and the angular position of the knob 14 then indicates the angular position of the crankshaft at which combustion is taking place in the first cylinder. Typically, this should conform to specifications issued by the engine manufacturer, a certain firing angle in the range of from four to ten degrees being typically specified. If the actual firing angle does not conform to the firing angle specified by the manufacturer, the operator may adjust controls associated with the injection pump 25 until the specified angle is measured.

This adjustment procedure is very similar to that employed with spark type engines but the actual operation of the instrumentation and circuitry is entirely different. With the instrument of the invention, there is a determination of the timing of an event occurring after top dead center rather than a determination of an event occurring prior to top dead center.

Figure 2:
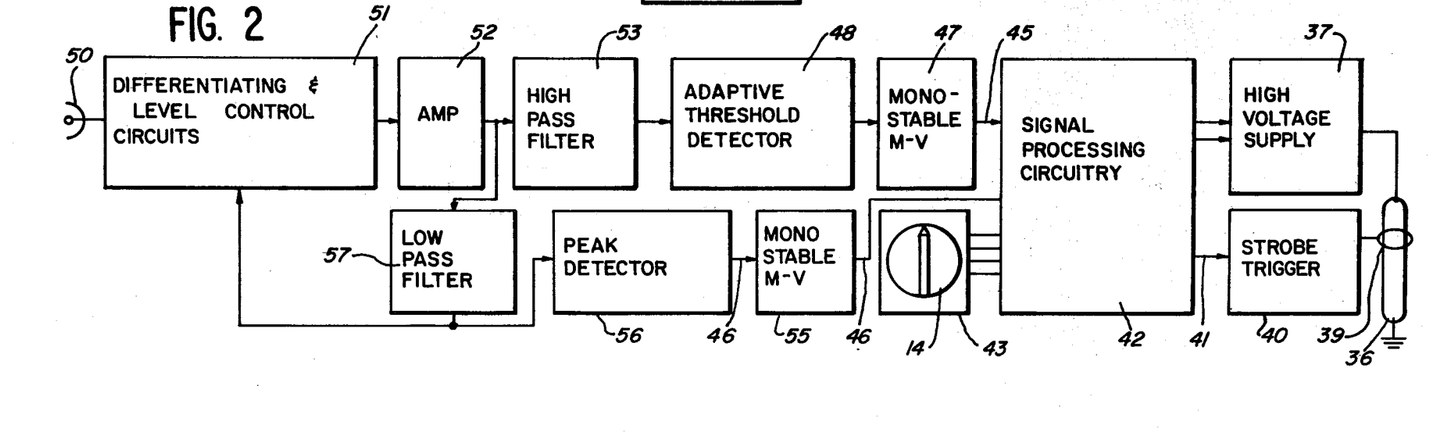
FIG. 2 is a block diagram of circuitry of the instrument shown in FIG. 1.

FIG. 2 is a block diagram of circuitry of the instrument 10. A strobe lamp 36 is provided which has a high voltage terminal connected to a high voltage power supply 37, a switch controlled by trigger button 13 being provided to control energization of the supply 37. A trigger electrode 39 of the lamp 36 is connected to a trigger circuit 40 which is supplied with a triggering signal from processing circuitry 42. Processing circuitry 42 also supplies a clock signal to the power supply circuitry 37 which is a fly back supply operating at a relatively high frequency.

The processing circuitry is additionally connected to a switch 43 which is controlled by the adjustment 14 and which may preferably be a sixteen position rotary switch with four connections thereto to provide a hexadecimal output, commonly referred to as a "hex switch". Also, the processing circuitry 42 is supplied with signals on two input lines 45 and 46. The signal supplied on line 45 is designated as $S_F$ and is a signal derived from the transducer 18 at the moment of combustion or firing of the fuel injected into the first cylinder. The signal on line 46 is designated as $S_P$ and is a reference signal which occurs at a preceding time in the engine cycle, preferably not later than the top dead center position. The processing circuitry 42 responds to such signals to apply a trigger signal to the circuit 40 and to cause flashing of the lamp 36 at a angular position of the crankshaft which is controlled by the angular timing of the firing signal $S_F$ and by the adjustment of the knob 14. With the knob 14 in a zero position as illustrated, the flashing of the strobe lamp 36 is substantially coincident with the engine firing. When the knob 14 is rotated away from the zero position, the flashing of the strobe lamp 36 is advanced with respect to the engine firing by a certain number of degrees as indicated on the calibration marks associated with the switch 43. If, for example, the knob 14 is rotated to a six degree position and if, at the same time, the index marks illuminated by the strobe lamp 36 indicate a top dead center position, an indication is obtained that the engine firing occurs six degrees after the top dead center position.

The firing signal on line 45 is generated by a monostable multivibrator 47 which is triggered from a signal applied from an adaptive threshold detector circuit 48. An input signal for the detector circuit 48 is derived from the transducer 18 which is connected to a jack 50, the signal being applied through a differentiating and level control circuit 51, an amplifier circuit 52 and a high-pass filter circuit 53. Such circuits operate in conjunction with the adaptive threshold detector circuit 48 to respond to an abrupt rise in pressure produced within the cylinder at the time of firing.

The reference signal $S_P$ on line 46 is developed by a monostable multivibrator 55 which is supplied with a signal from a peak detector circuit 56, the peak detector circuit 56 being supplied with a signal from the output of a low-pass filter 57 which has an input connected to the output of amplifier 52. The low-pass filter circuit 57 also applies a signal to the circuit 51 for control of signal level. The peak detector 56 operates in conjunction with the low-pass amplifier circuit 57 to develop a signal in response to a rise in pressure within the engine cylinder which is ahead of the firing within the cylinder, typically being slightly in advance of the top dead center position.

Figure 3:
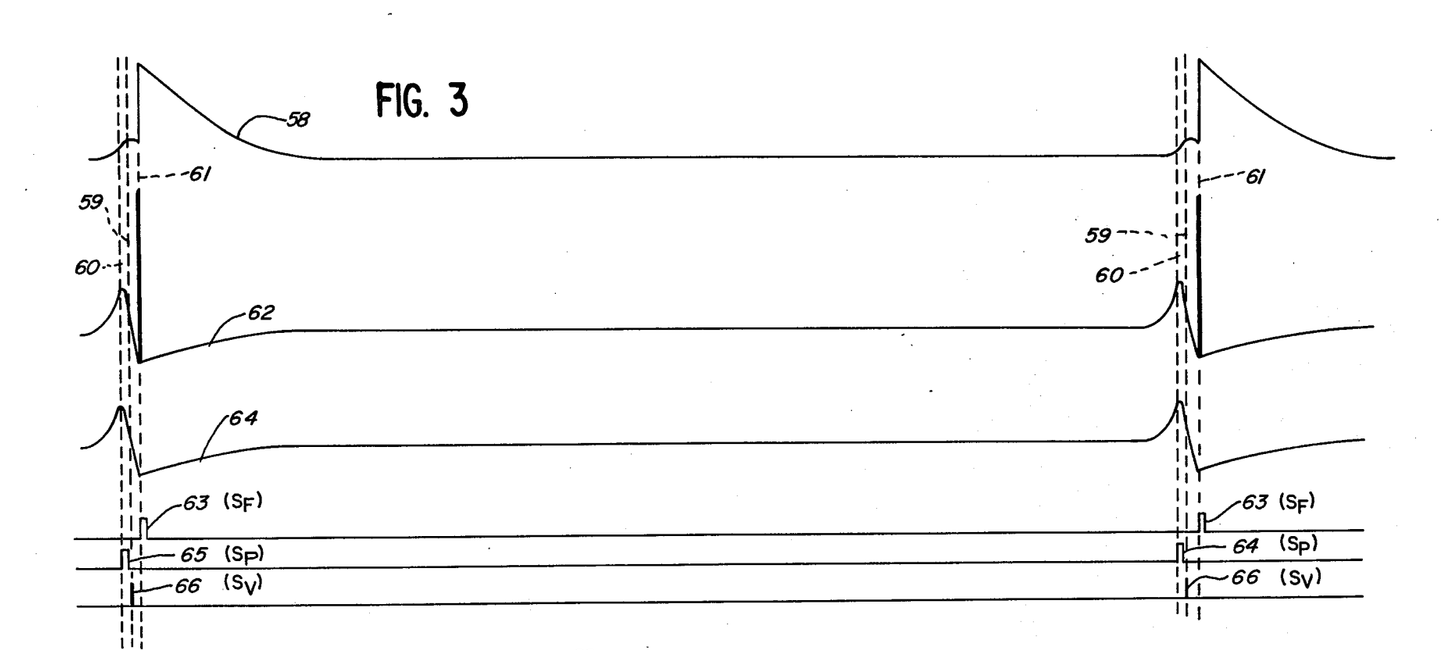
FIG. 3 graphically illustrates the variation of engine cylinder pressure with time during an engine operating cycle and also shows the waveform of signals which are developed at various points in the circuitry shown in block form in FIG. 2.

The basic mode of operation of the amplifier, filter and detector circuits may be clarified with reference to FIG. 3 in which reference numeral 58 indicates the variation of engine cylinder pressure with time during corresponding portions of two successive engine cycles. The pressure waveform is indicated as the piston moves upwardly toward and then downwardly away from the top dead center position which is indicated by the vertical dotted line 59 in the diagram. As the piston approaches the top dead center position, the pressure rises relatively rapidly with the rate of change of pressure reaching a peak at a time or phase angle as indicated by dotted line 60. At a certain time or angle after top dead center, and after injection of fuel into the engine, combustion occurs to cause a very sharp rise in pressure, at a time as indicated by dotted line 61. Then as the combustion proceeds and the piston moves away from the top dead center position, the pressure falls to a lower value.

The differentiating and level control circuit 51 operates in conjunction with the transducer 18 to develop a signal as indicated by reference numeral 62 which has an amplitude corresponding to the rate of change of the pressure within the cylinder as indicated by reference numeral 58. It is noted that the signal 62 has a first peak produced at the time or phase angle indicated by dotted line 60 and has a second peak at a time or phase angle indicated by dotted line 61. The second peak has a relatively steep leading edge, with a rapid rise time and corresponding high frequency components. Such components are detected by the detector 48 operating in conjunction with the high-pass filter 53 to trigger the multivibrator 47 and to produce the firing pulse signal $S_F$ as indicated by reference numeral 63 in FIG. 3.

When the signal as indicated by reference numeral 62 is passed through the low-pass filter 57, the second peak is attenuated and a signal is produced as indicated by reference numeral 64. The peak of the signal 64 is detected by the peak detector 56 and applied to the multivibrator 55 to develop the reference signal $S_P$ on line 46 as indicated by reference numeral 65. Actually, the signal 65 may be produced just after the maximum point of the peak, in a manner as hereinafter described.

The processing circuitry 42 operates to generate a signal on line 41 which is applied to the strobe circuit 40 having a waveform as indicated by reference numeral 66, the signal being designated as a $S_Y$ signal. This signal is in the form of a short pulse and the time or phase angle of generation thereof is dependent upon the time or phase angle of generation of the firing pulse in the preceding cycle and also upon the position of adjustment of the knob 14. When the knob 14 is at a "0" position, the pulse 66 is substantially coincident with the pulse 63. When the knob 14 is moved away from the "0" position, the pulse signal 66 is advanced in time or phase angle, moving to the left in the diagram of FIG. 3. Thus, it may be moved to a position in alignment with the dotted line 59, i.e., the top dead center position, as is illustrated in FIG. 3. The position of adjustment on the knob 14 then indicates the phase advance of the engine firing with respect to the top dead center position.

Figure 4:
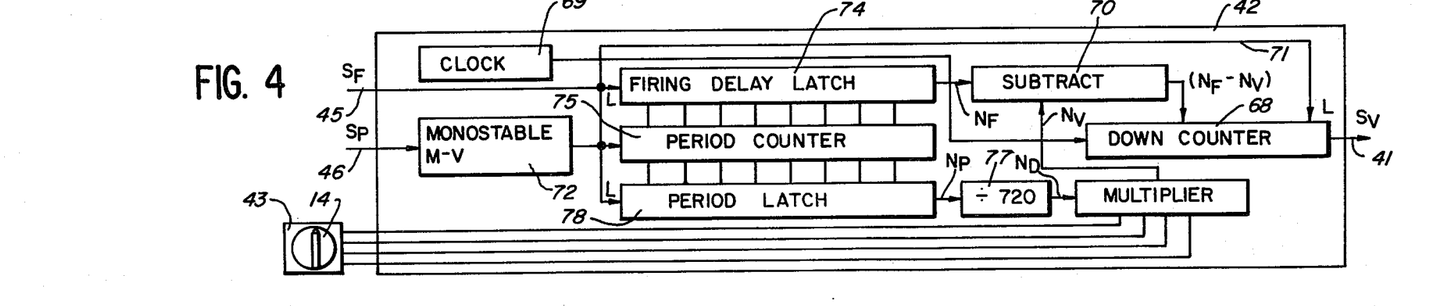
FIG. 4 is a functional block diagram of processing circuitry shown as one block in the diagram of FIG. 2.

FIG. 4 is a functional block diagram of the processing circuitry 42. The output $S_V$ signal on line 41 is developed by a down counter 68 which is supplied with a clock signal from a clock 69 and with a certain digital number from a subtract circuit 70. The operation of the down counter 68 is initiated upon application of a load signal thereto, applied through a line 71 from a monostable multivibrator 72 which is triggered from a reference $S_P$ pulse applied through line 46. When the multivibrator 72 is triggered from the reference $S_P$ pulse, a load signal is immediately applied to the down counter 68 to initiate operation thereof, the counter 68 being operative to develop an output signal on line 41 after a number of clock pulses equal to a number initially entered into the counter 68 at the time of loading thereof.

The number entered into the down counter 68 from the subtract circuit is dependent upon the number of clock pulses produced between reference and firing signals $S_P$ and $S_F$ in a preceding engine cycle, indicated by "$N_F$" in FIG. 4. The number entered into the down counter 68 is also dependent upon and is reduced as a linear function of a number $N_V$ which is dependent upon the number of clock pulses generated in a complete engine cycle multiplied by a factor corresponding to the position of adjustment of the knob 14 of the switch 43.

The number $N_F$ is developed by a firing delay latch circuit 74 which is connected to a period counter 75 and which is supplied with a loading signal from line 45. The period counter 75 is supplied with clock pulses from the clock 69 and is supplied with a load signal from the multivibrator 72. When the firing pulse signal $S_F$ is applied through line 45, a number is stored in the latch 74 which is equal to the number of clock pulses counted by the counter 75 following the preceding reference $S_P$ signal applied on line 46.

The $N_V$ signal is supplied to the subtract circuit 70 from a multiplier circuit 76 which is connected to the switch 43 and also to the output of a divider circuit 77 connected to a period latch circuit 78 which is connected to the period counter 75, a load signal being applied to the latch circuit 78 from the multivibrator 72. In operation, a number of $N_P$ is developed in the period latch 78 equal to the number of clock pulses in a complete engine cycle from one reference pulse to the next and the number $N_P$ is divided by 720 to develop a number $N_D$ equal to the number of clock pulses in one degree of crankshaft rotation. The number $N_D$ is multiplied by the setting of the switch 43 to produce a number $N_V$ which is subtracted from the number $N_F$ in the subtract circuit 70 and entered into the down counter 68. The division factor of 720 is chosen for a four strokes per cycle engine, and should be 360 for a two strokes per cycle engine.

With the processing operation of the instrument 10, the clock frequency is not critical and it can vary over a substantial range without any effect on accuracy so long as it does not vary substantially from one edge and cycle to the next. Also, the crankshaft angle at which the reference pulses are developed is not critical so long as the phase angle does not vary substantially from one engine cycle to the next. It is, of course, necessary for the operation that the reference pulses occur ahead of the firing pulses and it is also highly desirable that the angular lead be relatively short, to obtain a high degree of accuracy.

It is noted that the function of the monostable multivibrator 72 is to minimize the likelihood of double triggering during one engine cycle. Its period of operation is preferably only slightly less than the minimum period for a complete engine cycle.

Figures 5, 6:
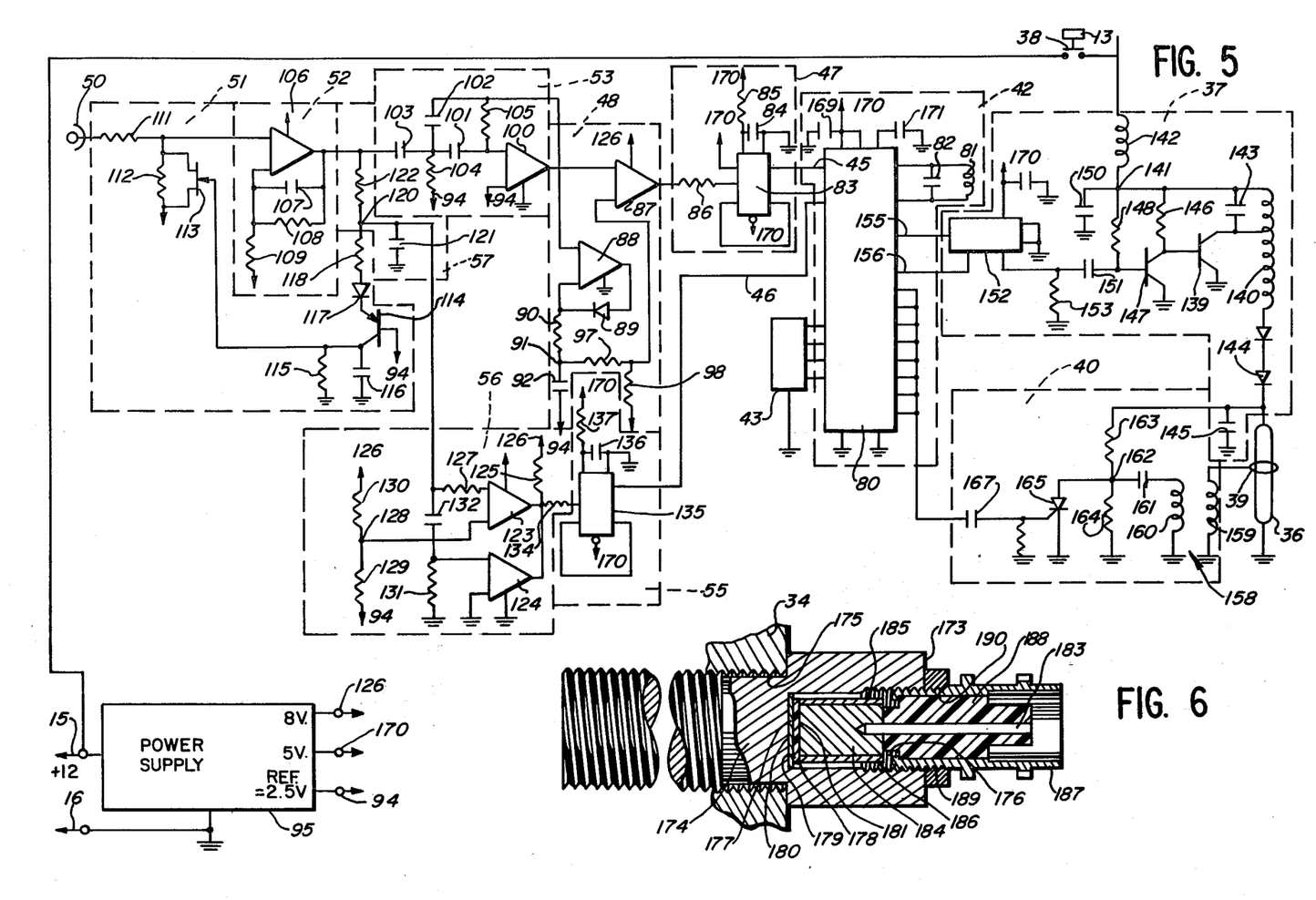
FIG. 5 is a schematic circuit diagram of certain circuitry shown in block form in FIG. 2, also showing the connections thereof to a microprocessor and also showing power supply and strobe lamp energizing circuitry.
FIG. 6 is a cross-sectional view illustrating the construction and mounting of a transducer used with the instrument of the invention.

FIG. 5 is a schematic circuit diagram for the instrument 10, showing a circuit in which the processing circuitry 42 includes a microprocessor 80 which has terminals connected to an external inductor 81 and capacitor 82 for providing a clock and which is operative to implement the functions performed by the circuits shown in FIG. 4.

FIG. 5 also shows detector, filter power supply, trigger and other circuits shown in block form in FIG. 2. In FIG. 5, an input port of the microprocessor 80 is connected to the Q output of a integrated circuit flip-flop 83 which is connected in circuit with a capacitor 84 and a resistor 85 to form the monostable multivibrator 47 which may produce an output pulse having a duration of on the order of 1 millisecond. An input of the flip-flop 83 is connected through a resistor 86 to the output of an operational amplifier 87 which, together with a second operational amplifier 88 and associated circuitry, forms the adaptive threshold detector 48. The output signal from the filter circuit 53 is applied to inputs of both amplifiers 87 and 88. A second input of amplifier 88 is connected to its output through a diode 89 and is connected to a resistor 90 to a circuit point 91 which is connected through a capacitor 92 to a source of a reference voltage, applied from a terminal 94 of a power supply 95. A voltage is developed at the circuit point 91 which is generally equal to the peak value of applied input pulses and a certain fraction of the voltage so developed is applied to a second input of the amplifier 87, through a voltage divider formed by resistors 97 and 98. Thus, a threshold detector is provided in which threshold level increases and decreases in accordance with the average peak value of the applied input pulse signals.

The high-pass filter 53 is formed by an operational amplifier 100 having one input connected to the power supply reference terminal 94 and having a second input connected to a resistor-capacitor network as shown, including capacitors 101, 102 and 103 and resistors 104 and 105.

An input of the high-pass filter circuit 53, at the left-end terminal of resistor 103, is connected to the output of an operational amplifier 106 which is connected in circuit with a capacitor 107 and resistors 108 and 109 to form the amplifier 52.

The differentiator and level control circuit 51 includes a resistor 111 connected in series between an input of the amplifier 106 and the jack 50 which is connected to the transducer 18. In addition, a resistor 112 and a field-effect transistor 113 in parallel therewith are connected between the output end of the resistor 111 and the power supply reference terminal 94. The load resistance presented by such components to the transducer 18 is such as to perform a differentiating function, the transducer 18 preferably being a piezoelectric transducer which is basically a charge-producing device, rather than a voltage-producing device. The signal produced at the output end of the resistor 11 and applied to the amplifier 106 is proportional to the rate of change of the pressure within the engine shoulder, thereby having a form as indicated by reference numeral 62 in FIG. 3.

The field-effect transistor 113 is controlled in a manner such as to oppose variations in the average level of signal applied to the amplifier 106, operating in effect as an automatic gain control circuit. Its input is connected to the collector of a transistor 114 and also through a resistor 115 and a capacitor 116 to ground. The base of the transistor 114 is connected to the reference terminal 94 while the emitter thereof is connected through a diode 117 and a resistor 118 to a circuit point 120 which forms the output terminal of the low-pass filter circuit 57. The filter circuit 57 is simply formed by a capacitor 121 connected between terminal 120 and ground and a resistor 122 connected between terminal 120 and the output of amplifier 126. In operation, voltage peaks which remain after removal of high frequency components are rectified or detected through the operation of diode 117 and transistor 114 to develop a signal applied to the transistor 113 to control the effective resistance between the output end of resistor 111 and the reference power supply terminal 94.

The peak circuit 56 includes a pair of comparator circuits 123 and 124 which respond to different characteristics of the signal applied from the low-pass filter 57, to develop an output signal when both characteristics are present, the outputs of the comparators 123 and 124 being connected together and through a resistor 125 to a terminal 126 of the power supply 95. One input of the comparator 123 is connected through a resistor 127 to the output of the low-pass filter 57 while the other is connected to a circuit point 128 which is connected through a resistor 129 to the reference terminal 94 and through a resistor 130 to the terminal 126.

One terminal of the comparator 124 is connected through a resistor 131 to ground and through a capacitor 132 to the output of the low-pass filter 57. The other input of comparator 124 is connected to ground. The upper input of the comparator 123 is a plus input and the upper input of comparator 124 is a minus input. At times other than during the peak portions of an applied signal, both comparators 123 and 124 operate to clamp the voltage at the output thereof at a low level.

The resistor 131 and the capacitor 132 operate as a differentiating circuit to produce a signal which rises to a high positive level during the leading portion of a peak of an applied signal and which crosses zero and drops to a high negative value on the trailing portion of a peak of an applied signal. During such a negative portion, the comparator 124 is effectively cut off and the comparator 123 which responds to the peak portion of an applied signal is also effectively cut off, thereby allowing the signal at the outputs of the comparators 123 and 124 to abruptly rise to a high level. The signal so developed is applied through a resistor 134 to the monostable multivibrator 55 which is formed by a flip-flop 135, a capacitor 136 and a resistor 137. The "Q" output of flip-flop 135 is connected through the line 46 to the microprocessor 80.

The high voltage power supply 37 in the illustrated embodiment is a fly back type of supply and includes an output transistor 139 having a grounded emitter and having a collector connected to a tap of a transformer winding 140, one end of the winding 140 being connected to a circuit point 141 which is connected through a choke 142 to the switch 38 and with a capacitor 143 connected between the tap of the transformer winding 140 and the circuit point 141. The other end of the transformer winding 140 is connected through rectifying diodes 144 to an electrode of the lamp 36 which is connected through a capacitor 145 to ground.

The base of the transistor 139 is connected through a resistor 146 to the circuit point 141 and is connected to the collector of a driver transistor 147 which has a grounded emitter. The base of the transistor 147 is connected through a resistor 148 to the circuit point 141 which is connected to ground through a capacitor 150. The base of the transistor 147 is also connected through a coupling capacitor 151 to the output of a divider circuit 152 which is connected through a resistor 153 to ground. The divider circuit 152 is connected to terminals 155 and 156 of the microprocessor 80 to receive clock signals therefrom and to provide lower frequency clock signals thereto.

In operation, the output transistor 139 is rendered conductive to build up current through a portion of the winding 140 and to build up a magnetic field in the transformer core. The transistor 139 is periodically cut off whereupon a high voltage is developed across the entire transformer winding 140 to qharge up the capacitor 145 for supply of a high voltage to the lamp 36. It is noted that the clock signal applied to the divider 152 may be on the order of 267 KHz and the divider circuit 152 may have a first output with a division ratio of 16 so that the frequency of operation in the power supply circuit 37 is on the order of 16.75 KHz. Divider circuit 152 may have a second output with a division ratio of four so that the clock frequency provided to the microprocessor on line 156 is on the order of 67 KHz.

The trigger circuit 40 comprises a transformer 158 having a secondary winding 159 connected between ground and the trigger electrode 39 and having a primary winding 160, one end of which is connected to ground and the other end of which is connected through a capacitor 161 to a circuit point 162. Circuit point 162 is connected through a resistor 163 to the output of the high voltage supply 37, through a resistor 164 to ground and directly to the anode of a silicon-controlled rectifier 165, the cathode of which is connected to ground. The gate of the rectifier 165 is connected through a resistor 166 to ground and through a capacitor 167 to output terminals of the microprocessor 80.

In operation, the capacitor 161 is normally charged from the high voltage supply 37 through the resistor 163, placing the circuit point 162 at a relatively high positive potential. When an output pulse is applied from the processor 80 and through the capacitor 167 to the gate of the rectifier 165, it is rendered highly conductive to discharge the capacitor 161 through the primary winding 160 and to develop a voltage across the secondary winding 159 which is applied to the trigger electrode 39 to cause the lamp 36 to flash.

The microprocessor may be an Intel 8748 microprocessor having X1 and X2 terminals connected to the inductor 81 and capacitor 82, and having terminals P10 through P17 connected together to form an output terminal which is connected to the capacitor 167 in the trigger circuit 40 and having $V_{SS}$ and EA terminals connected to ground. Terminals P20 through P23 may be connected to the four terminals of the hexadecimal switch 43 which may be an AMP number 2-435167-1. P27 may be connected to the common terminal of switch 43. The T∅ terminal may be connected through the line 45 to the multivibrator 47 and the $\overline{INT}$ terminal may be connected through the line 46 to the multivibrator 55. Terminals VDD and VCC may be connected together, through a capacitor 169 to ground and to a +5 volt terminal 170 of the power supply 95. Terminal R may be connected through a capacitor 171 to ground.

To implement the operations as described above in connection with FIG. 4, an object code may be used for the Intel 8748 microprocessor, as follows:

```
:0 200000000402F8
:100010000990027B820A0E81562161B45851636FF03
:100020003FCE61D261D65163942B818A0FF18A06E
:100030002762AF45043C1F041F1F04291651864246
:100040000465FFDD963C42376CE65516548646043F
:100050000651F04421F89FF959900865E046516623C
:100060000045A1F045A65B66D89FF959900167983030
:100070001C42A0FF18A045047C1F046FBA5BB8188F
:100080000F0AC18F0AD14AE8AFF9A7F0A37530FAA6E
:100090000014AEB81CFC3760AC18FD3770ADE6A9FC97
:0E00A00003FCACFD13FFFDF61C27ADAC041CE9
:10010000BE099727AB672B672B2A672AEE12ADFB38
:0A011000AC83E6052B6C2B7D240563
:000000001FF
```

The by-pass filter 53 may pass frequencies above 10 KHz while the low-pass filter 57 may pass frequencies below 8 KHz, by way of example.

By way of example and not by way of limitation, the components shown in the illustrated circuit of FIG. 5 may have values as follows:

| Reference Numeral | Component Value |
|---|---|
| 84 | 0.01 |
| 85 | 100K |
| 86 | 10K |
| 90 | 100 |
| 92 | 1.0 |
| 97 | 1M |
| 98 | 3.3M |
| 101 | 0.01 |
| 102 | 0.0038 |
| 103 | 0.01 |
| 104 | 680 |
| 105 | 11K |
| 107 | 22p |
| 108 | 470K |
| 109 | 10K |
| 111 | 470K |
| 112 | 100K |
| 115 | 22M |
| 118 | 1K |
| 121 | 0.002 |
| 122 | 10K |
| 125 | 10K |
| 127 | 10K |
| 129 | 5.1K |
| 130 | 47K |
| 131 | 10K |
| 132 | 0.01 |
| 134 | 10K |
| 136 | 0.01 |
| 137 | 100K |
| 143 | 0.001 |
| 145 | 2.0 |
| 146 | 1K |
| 148 | 10K |
| 150 | 1.0 |
| 151 | 10.0 |
| 153 | 10K |
| 163 | 220K |
| 164 | 220K |
| 166 | 1K |
| 167 | 0.01 |

Capacitor values are in microfarads unless otherwise indicated.

FIG. 6 shows the mounting and construction of the transducer 18 which is substantially the same as the transducer disclosed in the Dooley et al. U.S. Pat. No. 4,227,402, issued Oct. 14, 1980. As shown, the transducer 18 includes a body 173 having an externally threaded shank portion 174 which is threaded into an internally threaded opening 175 of the engine block 34, in place of the glow plug normally threaded into the opening 175. A shoulder of the body 173 seats against the block 34. A cavity 176 is provided in the body 173 and has a bottom surface 177. A disc 178 of piezoelectric material has one face 179 secured to the surface 177 by an adhesive 180. An opposite face 181 of the disc 178 is electrically coupled to a conductor 182 through a member 184 of the conductor material which engages the face 181 and which has an opening receiving an end of the conductor 183. An insulating sleeve 185 is disposed around the conductive member 184 and cooperates therewith to form a plug 186. The conductor 183 is supported within a connector housing 87 by means of an insulating member 188, the connector member 187 having external threads 189 which are threaded into the body 173 and also engaged with internal threads 190 of a holding nut. The operation of the transducer 18 is as disclosed in the aforesaid Dooley et al patent.

It will be understood that modifications and variations may be effected without departing from the spirit and scope of the novel concepts of this invention.

We claim:

1. An instrument for timing of an engine which includes a crankshaft rotatable through a certain integer number of revolutions during an engine operating cycle, at least one cylinder, and a piston in said cylinder coupled to said crankshaft to be moved through a top dead center position during each revolution of said crankshaft, said instrument comprising: firing pulse means for developing a firing pulse during each engine operating cycle, reference pulse means for developing a reference pulse during each engine operating cycle and at a time in advanced relation to a corresponding firing pulse, and delay measuring means for measuring the elapsed time between one of said reference pulses and an immediately following one of said firing pulses, output pulse means coupled to said reference pulse means and to said delay measuring means for responding to a reference pulse subsequent to said one of said reference pulses and for thereafter producing an output pulse after a certain delay which varies as a linear function of said measured elapsed time between said one of said reference pulses and said immediately following one of said firing pulses, said delay measuring means and output pulse means being operable in response to reference and firing pulses in each engine operating cycle to produce an output pulse in timed relation to the firing pulse in the next subsequent engine operating cycle.

2. In an instrument as defined in claim 1, wherein indicating means are associated with said engine for indicating the angular position of said engine crankshaft, said instrument comprising comparison means for comparing the timing of said output pulse with the indicated angular position of said engine crankshaft.

3. In an instrument as defined in claim 2, wherein the engine includes a part rotatable with the crankshaft and a stationary part with marks on said parts which form said indicating means and which are alignable to indicate the angular position of the crankshaft, said comparison means comprising a flashlamp energized in response to said output pulse and arranged to illuminate said marks.

4. In an instrument as defined in claim 3, adjustable means associated with said output pulse means for reducing said certain delay by an adjustable amount to permit alignment of marks at the time of flashing of said flashlamp.

5. In an instrument as defined in claim 4, wherein marks are aligned when said crankshaft is at an angular position corresponding to a top dead center position of said piston and wherein said firing pulse is developed at a time after the time at which said piston reaches a top dead center position, said reference pulse means being arrange to develop said reference pulse at a time not later than said top dead center position time.

6. In an instrument as defined in claim 4, said adjustable means being calibrated in units of angular rotation of said engine crankshaft.

7. In an instrument as defined in claim 1, said delay means comprising a clock for supplying high frequency clock pulses, and counter means for counting the number of said clock pulses during said elapsed time between said one of said reference pulses and said immediately following one of said firing pulses.

8. An instrument for timing of an engine which includes a crankshaft rotatable through a certain integer number of revolutions during an engine operating cycle, at least one cylinder, and a piston in said cylinder coupled to said crankshaft to be moved through a top dead center position during each revolution of said crankshaft, said instrument comprising: firing pulse means for developing a firing pulse during each engine operating cycle, reference pulse means for developing a reference pulse during each engine operating cycle and at a time in advanced relation to a corresponding firing pulse, and delay measuring means for measuring the elapsed time between one of said reference pulses and an immediately following one of said firing pulses, said delay means comprising a clock for supplying high frequency clock pulses, and counter means for counting the number of said clock pulses during said elapsed time between said one of said reference pulses and said immediately following one of said firing pulses, output pulse means comprising a down counter supplied with said clock pulses, entering means for entering into said down counter a number which is an algebraic sum of certain numbers, one of said certain numbers being the number of clock pulses counted by said counter means during said elapsed time between said one of said reference pulses and said immediately following one of said firing pulses, and means for responding to a reference pulse subsequent to said one of said reference pulses for initiating operation of said down counter means.

9. In an instrument as defined in claim 8, another of said certain numbers being of negative sign and having a magnitude corresponding to the product of a certain fraction and the number of clock pulses in a complete engine cycle.

10. In an instrument as defined in claim 9, adjustable means for supplying said another of said numbers to said entering means with the value of said certain fraction being adjustable.

11. An instrument for timing of an engine which includes a crankshaft rotatable through a certain integer number of revolutions during an engine operating cycle, at least one cylinder, and a piston in said cylinder coupled to said crankshaft to be moved through a top dead center position during each revolution of said crankshaft, said instrument comprising: firing pulse means for developing a firing pulse during each engine operating cycle, reference pulse means for developing a reference pulse during each engine operating cycle and at a time in advanced relation to a corresponding firing pulse, and delay measuring means for measuring the elapsed time between one of said reference pulses and an immediately following one of said firing pulses, at least one of said pulse means comprising transducer means responsive to the pressure in said cylinder for producing a corresponding electrical signal.

12. In an instrument as defined in claim 11, said firing pulse means comprising said transducer means and circuit means coupled to said transducer means for developing said firing pulse in response to an abrupt rise in pressure produced within said cylinder upon combustion therein.

13. In an instrument as defined in claim 12, said circuit means comprising high-pass filter means.

14. In an instrument as defined in claim 12, said circuit means comprising an adaptive threshold detector adapted to produce an output signal when the peak of an input signal exceeds a certain fraction of the average peak value of signal applied over a substantial interval of time.

15. In an instrument as defined in claim 11, said reference pulse means comprising said transducer means and circuit means coupled to said transducer means for developing said reference pulse in response to a peak in the rate of change of pressure within said cylinder which occurs in advance of said top dead center position of said crankshaft.

16. In an instrument as defined in claim 15, said firing pulse means also comprising said transducer means and said circuit means coupled to said transducer means, said circuit means being also operative for developing said firing pulse in response to an abrupt rise in the pressure within said cylinder upon combustion therein.

17. In an instrument as defined in claim 16, low-pass filter means associated with said circuit means for developing said reference pulse, and by-pass filter means associated with said circuit means for producing said firing pulse.

18. In an instrument as defined in claim 15, said circuit means comprising means operative as a differentiating circuit to produce a first differentiating signal corresponding to the rate of change of pressure in said cylinder, a second differentiating circuit responsive to said first differentiating signal to produce a second differentiating signal corresponding to the rate of change of said first differentiating signal, and means responsive to said first and second differentiating signal for producing an output signal during a peak portion of the first differentiating signal and during a simultaneous generation of a negative-going portion of said second differentiating signal.

19. In an instrument as defined in claim 11, said transducer means including a piezoelectric transducer and impedance means coupled across said transducer and having an impedance such as to produce a signal proportional to the rate of change of pressure within said cylinder.

20. In an instrument as defined in claim 19, means operative in response to an increase in the level of said signal for reducing said impedance and controlling the level of said signal.

21. An instrument for timing of an engine which includes a crankshaft rotatable through a certain integer number of revolutions during an engine operating cycle, at least one cylinder, and a piston in said cylinder coupled to said crankshaft to be moved through a top dead center position during each revolution of said crankshaft, said engine having a pair of marks aligned in said top dead center position, one mark being stationary and the other being on a part rotatable with said crankshaft, said instrument comprising: sensing means coupled to said engine and including firing pulse means for developing a firing pulse during each engine operating cycle in response to actual combustion within said cylinder and at a crankshaft angle after said top dead center position, a strobe lamp operable for illuminating said marks, and circuit means coupled to said sensing means for developing a strobe pulse to flash said lamp, said circuit means being operable to produce said strobe pulse at the crankshaft angle of firing of said strobe lamp and being adjustable to advance the angle of said strobe pulse to obtain alignment of said marks at the time of flashing of said strobe lamp, and indicating means for indicating the angle of advance of said strobe pulse relative to the angle of said firing pulse, said sensing means including transducer means arranged to be mounted on said engine to respond to the pressure within said cylinder.

22. In an instrument as defined in claim 21, said instrument comprising a housing adapted to be hand-held and to carry said strobe lamp, said circuit means and said indicating means, and a cable connecting said circuit means to said transducer means.

* * * * *